Feb. 17, 1959  R. R. FARRELL  2,873,893
GREASE GUN

Filed May 21, 1956  2 Sheets-Sheet 1

INVENTOR
RICHARD R. FARRELL

Feb. 17, 1959 R. R. FARRELL 2,873,893
GREASE GUN

Filed May 21, 1956 2 Sheets-Sheet 2

INVENTOR
RICHARD R. FARRELL

United States Patent Office 2,873,893
Patented Feb. 17, 1959

2,873,893

GREASE GUN

Richard R. Farrell, Aspinwall, Pa., assignor to Universal Lubricating Systems, Inc., Oakmont, Pa., a corporation of Delaware Application May 21, 1956, Serial No. 586,024

10 Claims. (Cl. 222—326)

This invention relates to grease guns. It relates more particularly to a grease gun adapted to be applied directly to a container of grease to force the grease out of the container under pressure, the container being held by the grease gun while in use and the grease gun being adapted for manual manipulation to apply it to grease receiving fittings as in the lubrication of automobiles or other machinery.

The invention will be described for purposes of explanation and illustration as embodied in what is known in the trade as a "hand gun" and specifically to the species of hand gun which is known in the trade as a "lever gun," although in certain of its aspects the invention is not so limited.

Heretofore grease guns of the type above mentioned have had their own grease receiving compartments which had to be filled with grease and the grease replenished as it was used up. The filling with grease of the grease compartments of such guns was accomplished either by sucking in the grease by drawing back a plunger or by introducing the grease increment by increment using a suitable tool. In either case the operation was inefficient and messy and the gun relatively costly since the grease receiving compartment constituted a permanent part of the gun itself.

I have devised a hand gun which in the form shown in the drawings and hereinafter described is of the lever type although in certain of its aspects, as indicated above, the invention may be employed in hand guns of other types in which means other than a lever is employed for exerting pressure on the grease to force the grease into the grease receiving fitting. My grease gun is adapted for application to or combination with a container containing grease so that the permanent grease gun structure itself does not include any grease receiving compartment. Grease is customarily packaged in cans. In applying my grease gun to a can of grease the can lid is removed and the grease gun and can are assembled to each other in such a way that the can is substantially sealed to the grease gun while means forming a part of the gun exert pressure on the grease in the can to force the grease out through a grease delivery portion forming part of the gun into grease receiving fittings. The means forming a part of the gun exerting pressure on the grease may be in the form of a plunger which is preferably spring-pressed to exert pressure on the grease. While the spring acting against the plunger might be sufficient without more to produce enough pressure on the grease to deliver the grease to a grease receiving fitting which does not offer great resistance to reception of the grease I preferably provide additional means for forcing the grease out through the grease delivery portion of the gun to overcome substantial resistance which is often encountered in grease receiving fittings.

My grease gun comprises a portion adapted to be applied to an opening in a container containing grease to substantially seal with the container, a grease delivery portion, a conduit adapted to communicate with the interior of the container and communicating with the grease delivery portion and means for forcing grease through the conduit.

In a preferred form my grease gun comprises a portion adapted to be applied to an opening in a container containing grease to substantially seal with the container, a plunger connected with said portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion and a conduit communicating with the passage through the plunger and with the grease delivery portion to convey to the grease delivery portion grease passing through the passage in the plunger. Preferably impelling means are additionally provided for forcing grease through the conduit.

My grease gun preferably includes a stem projecting from the portion of the gun which is adapted to be applied to an opening in a container containing grease to substantially seal with the container, the stem being adapted to enter the container, and the plunger is preferably disposed about and slidable along the stem. The stem preferably has a passage therethrough through which grease from within the container may pass, and the conduit which conveys the grease to the grease delivery portion of the gun communicates with the passage through the stem.

The plunger is preferably laterally shiftable relatively to the stem to enable the plunger to accommodate itself to the wall of a misshapen container. I preferably provide a washer closely embracing the stem but slidable therealong and position the plunger against the washer, the plunger having an opening therein which receives the stem which is of substantially greater transverse dimension than the stem to provide for lateral shifting of the plunger relatively to the stem. The plunger should be on the pressure side of the washer so that the pressure of the grease presses the plunger against the washer. I find it desirable to use two washers, one on each side of the plunger, the washers both closely embracing the stem while the opening in the plunger is of substantially greater transverse dimension than the stem. The spring means acting on the plunger preferably act thereon through the washer at the side of the plunger at which the spring means are disposed. The extremity of the stem may be somewhat enlarged, as by expanding the same with an expanding tool, to prevent the outer washer from moving off of the stem which in turn retains the plunger on the stem.

The portion of the gun which is adapted to be applied to the opening in the container containing grease to substantially seal with the container may seal or fit to the container sufficiently tightly that the container is held in place in the grease gun thereby without any other holding means. However, especially since the tendency of the plunger is to force the container away from said portion of the gun, I prefer to provide a second portion of the gun cooperating with the first mentioned portion and adapted to engage the container at a location remote from the first mentioned portion to maintain the container in position relatively to the first mentioned portion. More specifically, my grease gun may comprise a supporting element, a portion supported by the supporting element adapted to be applied to an opening in a container containing grease to substantially seal with the container and a holding device carried by the supporting element and movable between inoperative position and operative position in engagement with the container at a location remote from said portion to maintain the container in position relatively to said portion. The holding device preferably has a part which when the holding device is in operative position is in locked position relatively to the supporting element to prevent inadvertent movement of the holding device to inoperative position.

In the present preferred form of grease gun the supporting element has a portion formed as a handle and impelling means are provided for forcing grease through the conduit which communicates with the grease delivery portion of the gun and an operating member is provided which is connected with the supporting element and has a portion formed as a handle disposed substantially opposite the handle of the supporting element for operating the impelling means. Thus one of the handles may be held in one hand and the other handle in the other hand and the gun operated similarly to operating a bellows.

Other details, objects and advantages of the invention will become apparent as the following description of a present preferred embodiment thereof proceeds.

In the accompanying drawings I have shown a present preferred embodiment of the invention in which Figure 1 is a view of a lever gun before application thereto of a can of grease;

Figure 1:
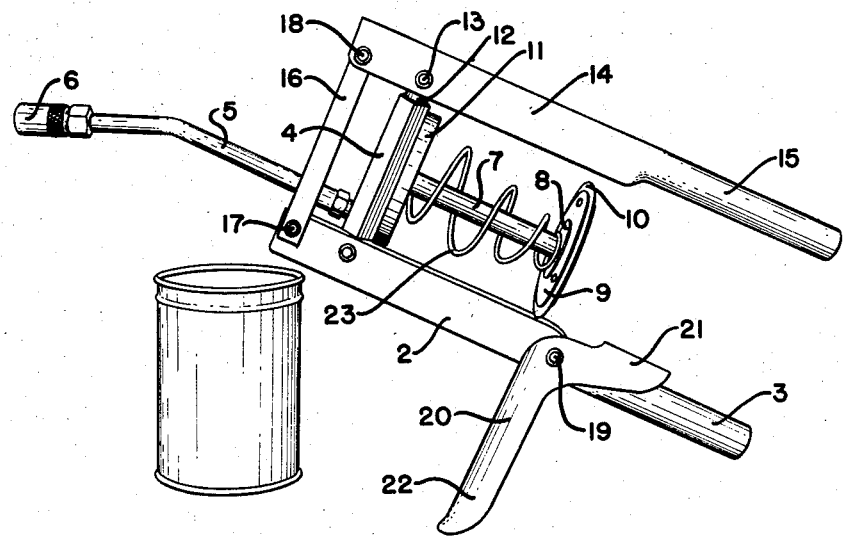

Referring now more particularly to the drawings, the grease gun shown therein is, as above indicated, a hand gun and more specifically a lever gun. It comprises a supporting element 2 having a portion 3 formed as a handle. Rigidly fastened to the supporting element 2 so as in effect to form an integral part thereof is a cylinder 4 having a bore therethrough which is closed at the extreme lower end of the cylinder viewing each of the figures of the drawings. Connected with the cylinder 4 and communicating with the bore therein adjacent the closed end thereof is a grease delivery portion 5 having at its extremity a coupler 6 which may be of any appropriate construction adapted for application to a grease receiving fitting so that grease delivered under pressure by the gun may be forced into the fitting.

Also connected with the cylinder 4 in the region of the mid-portion of the cylinder is a stem 7 having a bore completely therethrough from end to end and the left hand end of which, viewing the drawings, communicates with the bore in the cylinder 4. The stem 7 is rigid with the supporting element 2, the cylinder 4 and the grease delivery portion 5. The right hand end of the stem 7 is enlarged as by operating thereon with an expanding tool. Two washers 8 are disposed about the stem and closely embrace the stem although being slidable therealong. Disposed about the stem between the two washers 8 is a plunger 9. The opening in the plunger 9 is of substantially greater transverse dimension than the stem 7 to provide for lateral shifting of the plunger relatively to the stem to enable the plunger to accommodate itself to the wall of a misshapen container. The plunger may be of any suitable material such as metal or plastic but preferably has a flexible rim portion 10 adapted to substantially seal against the inner wall of the container. For example the plunger may consist of a rubber disk with a hole through the center disposed between two sheet metal disks with holes through the center, the sheet metal disks and the rubber disk being riveted together to form a unit. The rubber disk is of greater diameter than the sheet metal disks so that there is formed in effect a substantially rigid plunger but with a flexible periphery or rim which enables the plunger to substantially seal against the inner wall of the container. The plunger 9 together with the washers 8 is movable along the rigid hollow stem 7 and as above explained the plunger is also laterally shiftable relatively to the stem.

Rigidly connected with the cylinder 4 is a portion 11 which as shown is in the shape of a flanged metal cap which is adapted to be applied to an opening in a container containing grease to substantially seal with the container. The stem 7 passes through the portion 11 so that the bore in the stem communicates with the bore in the cylinder 4 as above explained.

A piston 12 operates in the cylinder 4, the upper end of the cylinder as shown in the drawings being open. The piston 12 is pivoted at 13 to an operating member 14 having a portion 15 formed as a handle disposed substantially opposite the handle 3 as shown in the drawings. A link 16 is pivoted to the supporting element 2 at 17 and to the operating member 14 at 18, enabling the operating member to be turned substantially about the pivot 18 to operate the piston 12 in the cylinder 4. When the piston 12 is withdrawn upwardly its forward end moves past the junction between the bore in the stem 7 and the bore in the cylinder permitting grease to move from the stem into the cylinder. When the piston is moved generally downwardly as shown in the drawings its forward end closes the entrance to the stem and forces the grease in the cylinder through the grease delivery portion 5.

Pivoted to the supporting element 2 at 19 is a holding device designated generally by reference numeral 20 and comprising a holding portion 21 and a handle portion 22. The holding device 20 is shown in inoperative position in Figures 1 and 2 and in operative position in Figure 3. The handle portion 22 of the holding device 20 is shaped to substantially lock to the handle 3 when the holding device is in operative position. The handle portion 22 is of approximately semicircular cross section but shaped so that when it is moved to the position of Figure 3 its sides are in tight engagement with the handle 3 or moved by slight springing movement into locked position relatively thereto.

Figure 2:
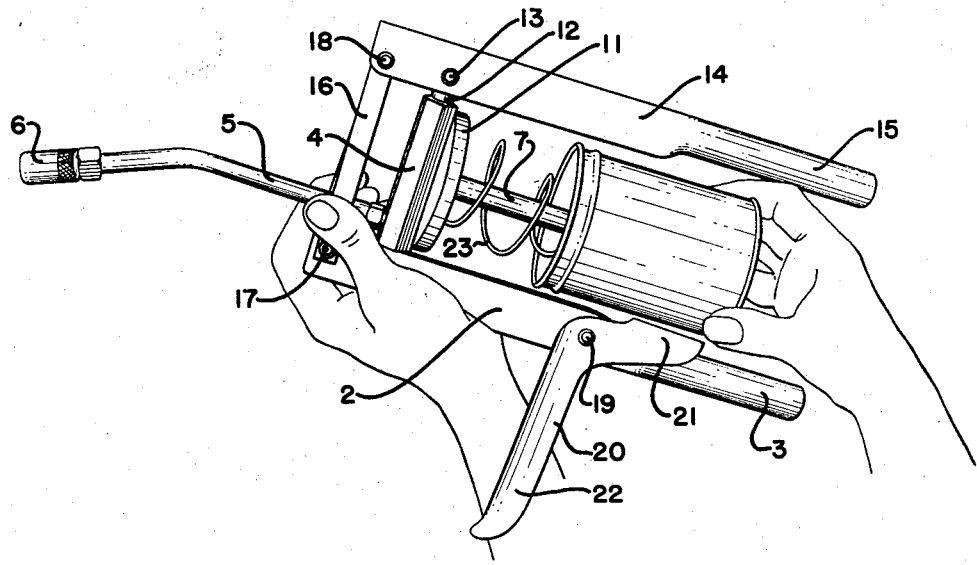
Figure 2 is a view showing how the can of grease is applied to the gun.
Figure 3:
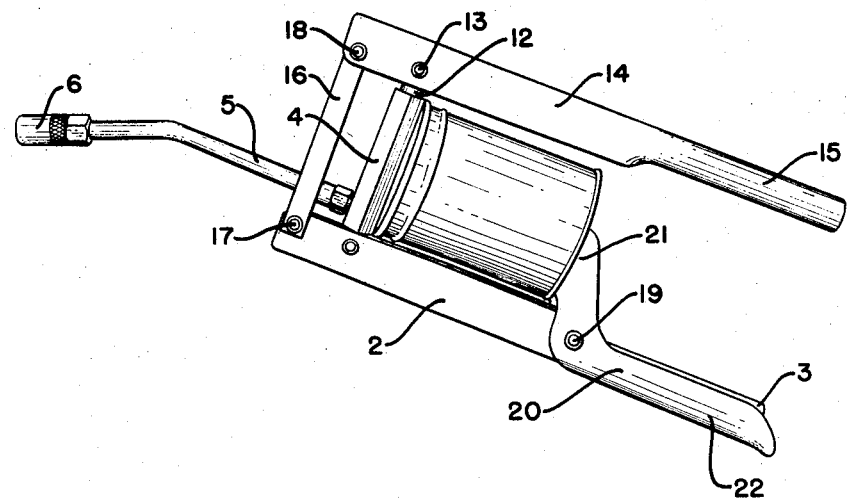
Figure 3 is a view showing the gun with the can of grease applied thereto ready for use in the lubrication of grease receiving fittings.

A compression coil spring 23 is disposed between the portion 11 and the washer 8 which is nearer to the portion 11 to urge the plunger 9 generally toward the right viewing the drawings but permitting the plunger to be forced toward the left, compressing the spring. The grease gun before being put into use is shown in Figure 1. Figure 2 shows a can full of grease being applied to the grease gun. The can lid has been removed and the can is applied so that the plunger 9 enters the can and substantially seals against the inner wall thereof. The can is held in the right hand and moved toward the left viewing Figure 2 while the grease gun is held in the left hand. The plunger 9 presses against the grease in the gun but grease is prevented from passing out through the grease delivery portion 5 during application of the can by reason of the fact that the piston 12 in the cylinder 4 is in position to close off communication between the bore in the stem 7 and the bore in the cylinder 4. The spring 23 is compressed and the rim of the can moves into embracing relationship about the portion 11 so as to substantially seal therewith. It may be that the portion 11 will fit into the rim of the can sufficiently tightly that no other means is required to hold the can in assembly with the grease gun while the grease gun is in use. However, especially since the tendency of the spring 23 is to force the can away from the portion 11, it is desirable to provide the holding device 20. When the can has been fully applied with its rim embracing the portion 11 of the grease gun the holding device 20 is moved to operative position as shown in Figure 3 with its holding portion 21 pressed against the bottom of the can and holding the can firmly in place.

In operation of the grease gun, once the can has been applied thereto, the handles 3 and 15 are grasped in the left and right hands of the user respectively, and it will be noted that when the user grasps the handle 3 he also grasps the handle portion 22 of the holding device 20 and thus positively maintains the holding device in operative position while the gun is in use in addition to the fact that the holding device is locked to the handle 3 as described above. The coupler 6 is applied to a grease receiving fitting into which grease is to be delivered. The handle 15 is moved away from the handle 3, retracting the piston 12 in the generally upward direction viewing the drawings until the forward end of the piston moves past the connection between the bore in the stem 7 and the bore in the cylinder 4. Such movement of the piston is accompanied by some swinging of the link 16 about the pivots 17 and 18; in other words, as the handle 15 moves away from the handle 3 the pivot 18 moves progressively closer to the cylinder 4.

When the retraction of the piston 12 has established communication between the bore in the stem 7 and the bore in the cylinder 4 the force of the spring 23 acting against the plunger 9 tends to force grease in the can out through the bore in the stem 7 and the bore in the cylinder 4 and through the grease delivery portion 5. Indeed, if little resistance is offered in the fitting, that may be sufficient to apply grease thereto. However, in normal operation the operator moves the handles 3 and 15 several times toward and away from each other to in effect pump grease under pressure of the piston 12 in the cylinder 4 out through the grease delivery portion 5. The provision of the link 16 approximately parallel to the cylinder 4 provides for great mechanical advantage and great pressure can be exerted on the grease by the piston in the cylinder 4 with comparatively light pressure forcing the handles 3 and 15 together.

Thus it is possible to utilize a can of grease with the can itself forming the grease containing receptable or compartment in the grease gun, eliminating the necessity of transferring grease from its original container to a grease containing compartment in the gun. The can may be applied and the gun used without getting grease on the hands. The gun is of rugged construction and low cost, requiring no integral grease receiving compartment. Exceptionally high mechanical advantage is provided for by the linkage through which the pressure applying piston is operated.

While I have shown and described a present preferred embodiment of the invention it is to be distinctly understood that the invention is not limited thereto but may be otherwise variously embodied within the scope of the following claims.

I claim:
1. A grease gun comprising a portion adapted to be applied to an opening in a container containing grease to substantially seal with the container, a plunger connected with said portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion and a conduit communicating with the passage through the plunger and with the grease delivery portion to convey to the grease delivery portion grease passing through the passage in the plunger.

2. A grease gun comprising a portion adapted to be applied to an opening in a container containing grease to substantially seal with the container, a plunger connected with said portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion, a conduit communicating with the passage through the plunger and with the grease delivery portion to convey to the grease delivery portion grease passing through the passage in the plunger and impelling means for forcing grease through the conduit.

3. A grease gun comprising a portion adapted to be applied to an opening in a container containing grease to substantially seal with the container, a stem projecting from said portion and adapted to enter the container, a plunger disposed about and slidable along the stem and adapted to substantially seal against the inner wall of the container so as to force grease in the container away from the opening, spring means adapted to urge the plunger into the container, the stem having a passage therethrough through which grease from within the container may pass, a grease delivery portion and a conduit communicating with the passage through the stem and with the grease delivery portion to convey to the grease delivery portion grease passing through the passage through the stem.

4. A grease gun comprising a portion adapted to be applied to an opening in a container containing grease to substantially seal with the container, a stem projecting from said portion and adapted to enter the container, a plunger disposed about and slidable along the stem and adapted to substantially seal against the inner wall of the container so as to force grease in the container away from the opening, the plunger also being laterally shiftable relatively to the stem to enable the plunger to accommodate itself to the wall of a misshaped container, spring means adapted to urge the plunger into the container, the stem having a passage therethrough through which grease from within the container may pass, a grease delivery portion and a conduit communicating with the passage through the stem and with the grease delivery portion to convey to the grease delivery portion grease passing through the passage through the stem.

5. A grease gun comprising a portion adapted to be applied to an opening in a container containing grease to substantially seal with the container, a stem projecting from said portion and adapted to enter the container, a washer closely embracing the stem but slidable therealong, a plunger disposed about and slidable along the stem and adapted to substantially seal against the inner wall of the container so as to force grease in the container away from the opening, the plunger lying against the washer and having an opening therein which receives the stem which is of substantially greater transverse dimension than the stem to provide for lateral shifting of the plunger relatively to the stem to enable the plunger to accommodate itself to the wall of a misshapen container, spring means adapted to urge the plunger into the container, the stem having a passage therethrough through which grease from within the container may pass, a grease delivery portion and a conduit communicating with the passage through the stem and with the grease delivery portion to convey to the grease delivery portion grease passing through the passage through the stem.

6. A grease gun comprising a portion adapted to be applied to an opening in a container containing grease to substantially seal with the container, a second portion cooperating with the first mentioned portion and adapted to engage the container at a location remote from the first mentioned portion to maintain the container in position relatively to the first mentioned portion, a plunger connected with the first mentioned portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion and a conduit communicating with the passage through the plunger and with the grease delivery portion to convey to the grease delivery portion grease passing through the passage in the plunger.

7. A grease gun comprising a supporting element, a portion supported by the supporting element adapted to be applied to an opening in a container containing grease to substantially seal with the container, a holding device carried by the supporting element and movable between inoperative position and operative position in engagement with the container at a location remote from said portion to maintain the container in position relatively to said portion, a plunger connected with said portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion and a conduit communicating with the passage through the plunger and with the grease delivery portion to convey to the grease delivery portion grease passing through the passage in the plunger.

8. A grease gun comprising a supporting element, a portion supported by the supporting element adapted to be applied to an opening in a container containing grease to substantially seal with the container, a holding device carried by the supporting element and movable between inoperative position and operative position in engagement with the container at a location remote from said portion to maintain the container in position relatively to said portion, the holding device having a part which when the holding device is in operative position is in locked position relatively to the supporting element to prevent inadvertent movement of the holding device to inoperative position, a plunger connected with said portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion and a conduit communicating with the passage through the plunger and with the grease delivery portion to convey to the grease delivery portion grease passing through the passage in the plunger.

9. A grease gun comprising a supporting element having a portion formed as a handle, a portion supported by the supporting element adapted to be applied to an opening in a container containing grease to substantially seal with the container, a plunger connected with said portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion, a conduit communicating with the passage through the plunger and with the grease delivery portion to convey to the grease delivery portion grease passing through the passage in the plunger, impelling means for forcing grease through the conduit and an operating member connected with the supporting element and having a portion formed as a handle disposed substantially opposite the handle of the supporting element for operating the impelling means.

10. A grease gun comprising a supporting element having a portion formed as a handle, a portion supported by the supporting element adapted to be applied to an opening in a container containing grease to substantially seal with the container, a holding device carried by the supporting element and movable between inoperative position and operative position in engagement with the container at a location remote from said portion to maintain the container in position relatively to said portion, a plunger connected with said portion and adapted to enter the container and substantially seal against the inner wall thereof so as to force grease in the container away from the opening, spring means adapted to urge the plunger into the container, the plunger having a passage therethrough through which grease from within the container may pass, a grease delivery portion, a conduit communicating with the passage through the plunger and with the grease delivery portion to convey to the grease delivery portion grease passing through the passage in the plunger, impelling means for forcing grease through the conduit and an operating member connected with the supporting element and having a portion formed as a handle disposed substantially opposite the handle of the supporting element for operating the impelling means.

References Cited in the file of this patent
UNITED STATES PATENTS

| Number | Name | Date |
|---|---|---|
| 1,379,471 | Mood | May 24, 1921 |
| 1,628,624 | Liverance | May 10, 1927 |
| 1,690,058 | Davis | Oct. 30, 1928 |
| 1,761,875 | Cordell et al. | June 3, 1930 |
| 1,941,140 | Dodge | Dec. 26, 1933 |
| 2,106,023 | Fear | Jan. 18, 1938 |
| 2,461,211 | Guthrie | Feb. 8, 1949 |
| 2,530,359 | Peterson | Nov. 14, 1950 |